US008117929B2

(12) United States Patent
Van Berkel et al.

(10) Patent No.: US 8,117,929 B2
(45) Date of Patent: Feb. 21, 2012

(54) CONTROL OF THE POSITIONAL RELATIONSHIP BETWEEN A SAMPLE COLLECTION INSTRUMENT AND A SURFACE TO BE ANALYZED DURING A SAMPLING PROCEDURE USING A LASER SENSOR

(75) Inventors: Gary J. Van Berkel, Clinton, TN (US); Vilmos Kertesz, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 495 days.

(21) Appl. No.: 12/217,225

(22) Filed: Jul. 2, 2008

(65) Prior Publication Data

US 2010/0000338 A1 Jan. 7, 2010

(51) Int. Cl.
*G01N 35/10* (2006.01)

(52) U.S. Cl. .................. 73/864.25; 73/864.24; 356/4.01

(58) Field of Classification Search ............... 73/863.01, 73/864.25

See application file for complete search history.

(56) References Cited

U.S. PATENT DOCUMENTS 5,081,353 A 1/1992 Yamada et al.
5,196,713 A * 3/1993 Marshall .................. 250/559.31
5,200,603 A 4/1993 Hackenberg et al.
6,715,341 B2 * 4/2004 Bowen et al. ..................... 73/37
6,803,566 B2 10/2004 Van Berkel
7,295,026 B2 11/2007 Van Berkel et al.
2002/0070345 A1 6/2002 Mizuochi et al.
2006/0284084 A1 12/2006 Morimoto et al.
2008/0033275 A1 * 2/2008 Blank et al. ................... 600/365

FOREIGN PATENT DOCUMENTS

EP 1666866 A1 6/2006

* cited by examiner

*Primary Examiner* — Hezron E Williams
*Assistant Examiner* — Paul West
(74) *Attorney, Agent, or Firm* — Michael E. McKee

(57) ABSTRACT

A system and method utilizes distance-measuring equipment including a laser sensor for controlling the collection instrument-to-surface distance during a sample collection process for use, for example, with mass spectrometric detection. The laser sensor is arranged in a fixed positional relationship with the collection instrument, and a signal is generated by way of the laser sensor which corresponds to the actual distance between the laser sensor and the surface. The actual distance between the laser sensor and the surface is compared to a target distance between the laser sensor and the surface when the collection instrument is arranged at a desired distance from the surface for sample collecting purposes, and adjustments are made, if necessary, so that the actual distance approaches the target distance.

17 Claims, 6 Drawing Sheets

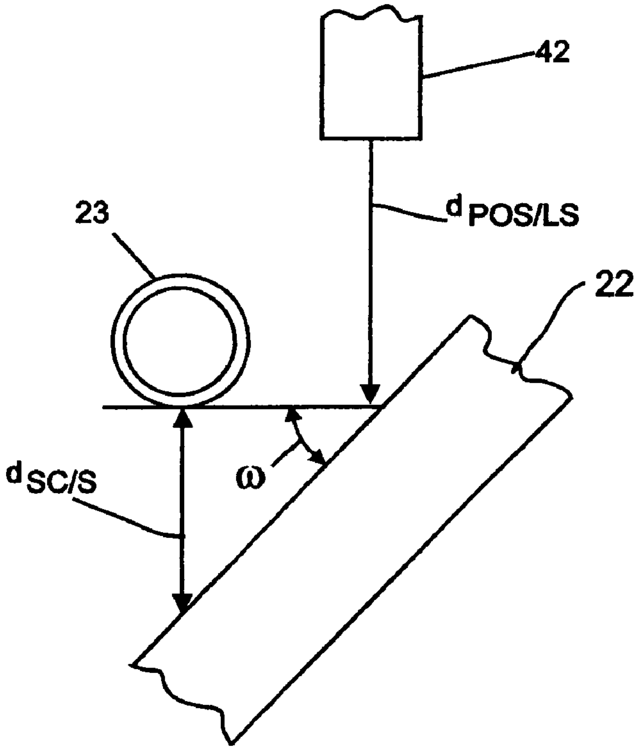
FIG. 7
FIG. 8
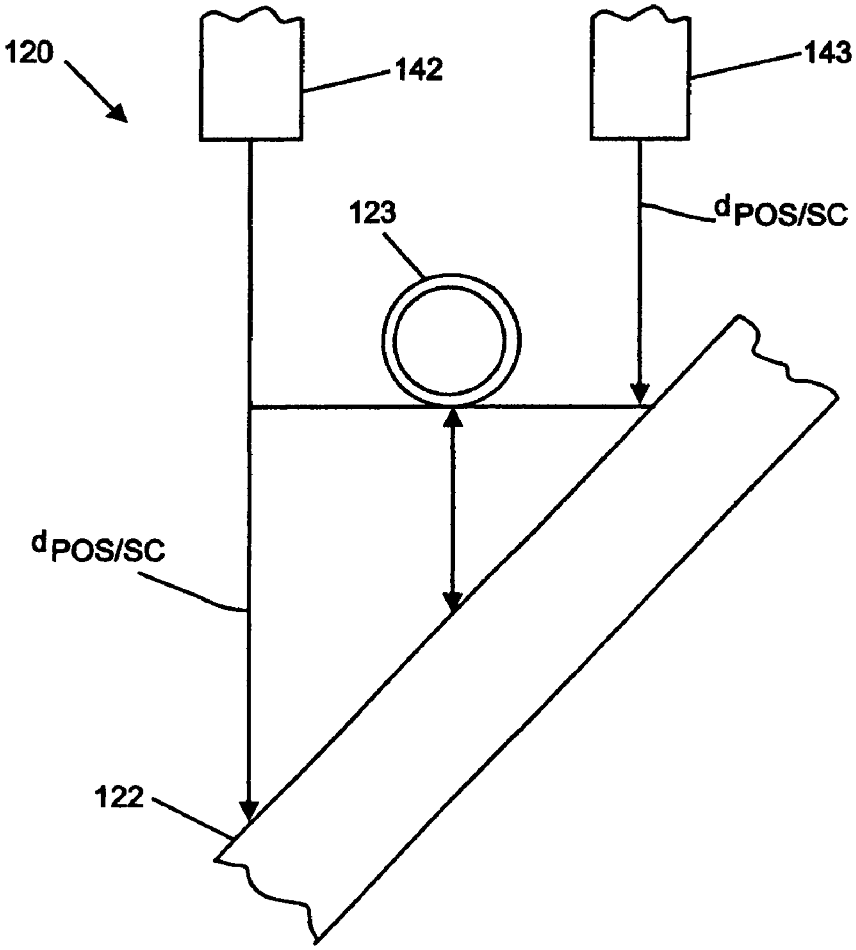

CONTROL OF THE POSITIONAL RELATIONSHIP BETWEEN A SAMPLE COLLECTION INSTRUMENT AND A SURFACE TO BE ANALYZED DURING A SAMPLING PROCEDURE USING A LASER SENSOR

This invention was made with Government support under Contract No. DE-AC05-00OR22725 awarded by the U.S. Department of Energy to UT-Battelle, LLC, and the Government has certain rights to the invention.

BACKGROUND OF THE INVENTION

This invention relates generally to sampling means and methods and relates, more particularly, to the means and methods for obtaining samples from areas, or spots, on a surface to be analyzed.

The sampling collection techniques with which this invention is concerned involve the positioning of a collection instrument or other sample collection device in relatively close proximity to a surface to be analyzed, or sampled, for purposes of gathering an amount (e.g. ions) of the surface for analysis. An example of one such collection technique is used in conjunction with desorption electrospray ionization (DESI) mass spectrometry, but other techniques, such as may involve desorption atmospheric pressure chemical ionization (DAPCI) or matrix-assisted laser desorption/ionization (MALDI), are applicable here as well. In any of such techniques, it is desirable that the collection instrument be maintained at a predetermined, or desired, distance from the surface to be sampled for optimum collection results and to reduce the likelihood that the collection results will be misinterpreted when subsequently analyzed.

Furthermore, there exists some sample-collecting processes which involves a self-aspirating emitter through which an agent is delivered to the surface during the sample-collection process in a spray plume. Such an emitter is commonly fixed in position relative to the sample collection instrument, or device, so that the spray plume is directed toward the surface at a predetermined, or fixed, angle of incidence so that the delivered spray plume is intended to strike the surface to be sampled at a predetermined location for effecting the movement of an amount of the surface to be sampled toward the collection instrument. In other words, there is a desirable spatial assignment which exists between the emitter, the collection instrument and the surface to be analyzed so that if the surface is not accurately positioned in a location (e.g. within a predetermined plane) in which the surface is intended to be positioned, poor collection results are likely to be obtained.

To obviate the need for an operator to make manual adjustments to the distance between the sample collection instrument and the surface during the course of a sample collection process, it would be desirable to provide a system and method for accurately controlling the sample collection device-to-surface distance during a sample collection process.

Accordingly, it is an object of the present invention to provide a system and method for automatically controlling the distance between a sample collection instrument, or device, and the surface to be analyzed, or sampled, with the instrument which utilizes a laser sensor for monitoring the actual collection instrument-to-surface distance during the sampling procedure.

Another object of the present invention is to provide such a system and method wherein the collection instrument-to-surface distance is continually monitored throughout the sampling procedure and adjusted, as necessary, so that the collection instrument-to-surface distance is maintained at an optimal spacing.

Yet another object of the present invention is to provide such a system which reduces the likelihood that the results of the sample collection process will be misinterpreted when analyzed.

A further object of the present invention is to provide such a system which, when used in conjunction with sample-collecting operations which utilize an emitter which is directed at a predetermined angle toward the sample helps to maintain the proper spatial assignment between the emitter, the collection instrument and the surface to be analyzed during a sample collecting process.

Yet another object of the present invention is to provide such a system which is uncomplicated in structure, yet effective in operation.

SUMMARY OF THE INVENTION

This invention resides in a sampling system and method for collecting samples from a surface to be analyzed.

The sampling system includes a sample collection instrument through which a sample is collected from a surface to be analyzed and means for moving the collection instrument and the surface toward and away from one another and wherein there exists a desired positional relationship between the collection instrument and the surface for sample collecting purposes. The system also includes distance-measuring means including a laser sensor arranged in a fixed positional relationship relative to the collection instrument for generating a signal which corresponds to the actual distance between the laser sensor and the surface and wherein there exists a target distance between the laser sensor and the surface when the collection instrument and the surface are arranged in the desired positional relationship for sample collecting purposes.

In addition, the system includes means for receiving the signal which corresponds to the actual distance between the laser sensor and the surface and comparison means for comparing the actual distance between the laser sensor and the surface to the target distance between the laser sensor and the surface and for initiating the movement of the laser sensor and the surface toward or away from one another when the difference between the actual distance between the laser sensor and the surface and the target distance is outside of a predetermined range so that by moving the surface and the collection instrument toward or away from one another, the actual distance between the laser sensor and the surface approaches the target distance.

The method of the invention includes the steps carried out by the system of the invention. In particular, such steps include the generating of a signal with the distance-measuring means which corresponds to the actual distance between the laser sensor and the surface and determining the actual distance between the laser sensor and the surface from the signal generated by the distance-generating means. Then, the actual distance between the laser sensor and the surface is compared to the target distance, and movement of the surface and the laser sensor toward or away from one another is initiated when the difference between the actual distance between the laser sensor and the surface and the target distance is outside of a predetermined range so that by moving the surface and the laser sensor toward or away from one another, the actual distance approaches the desired target distance.

BRIEF DESCRIPTION OF THE DRAWINGS

FIG. 7 is a view similar to that of FIG. 5*a* except that the surface is canted with respect to the horizontal.

FIG. 8 is a view similar to that of FIG. 7 illustrating schematically an exemplary relationship between components of an alternative system within which the present invention is embodied and wherein such components includes two laser sensors.

DETAILED DESCRIPTION OF AN ILLUSTRATIVE EMBODIMENT

Figure 1:
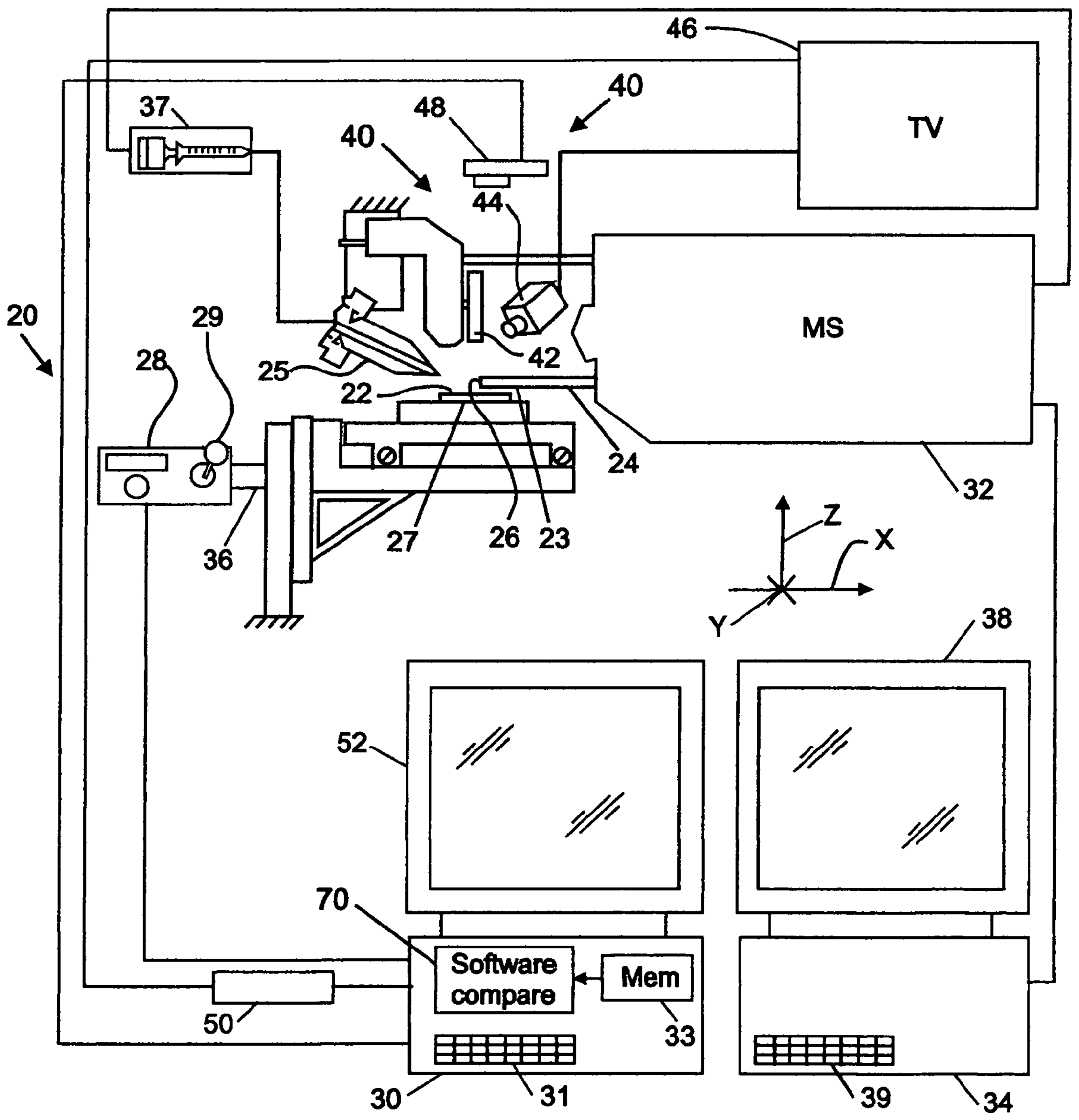
FIG. 1 is a schematic view of the system 20 within with features of the present invention are incorporated.

Turning now to the drawings in greater detail and considering first FIG. 1, there is schematically illustrated an example of an embodiment, generally indicated 20, of a desorption electrospray (DESI) system within which features of the present invention are embodied for purposes of obtaining samples from at least one spot, or area, of a surface 22 (embodying a surface to be sampled) for subsequent analysis. Although the surface 22 to be sampled can, for example, be an array whose samples are desired to be analyzed with a mass spectrometer 32, the system 20 can be used to sample any of a number of surfaces of interest. Accordingly, the principles of the invention can be variously applied.

Furthermore and although the depicted system 20 is described herein in connection with desorption electrospray ionization (DESI), the principles of the invention described herein are applicable as well to other surface sampling techniques, such as desorption atmospheric pressure chemical ionization (DAPCI) and matrix-assisted laser desorption/ionization (MALDI) mass spectrometry.

The system 20 of the depicted example includes a collection instrument in the form of a sampling probe 24 (and an associated DESI emitter 25) comprising a capillary tube 23 which terminates at a tip 26 which is positionable adjacent the surface 22. During a sampling process, for example, a predetermined agent is directed from a syringe pump 37 and onto the surface 22 to be sampled through the emitter 25, and an amount of the sample (e.g. ions of the sample) is conducted by way of a vacuum (and/or an electric field), away from the remainder of the surface 22 through the capillary tube 23 for purposes of analyzing the collected sample.

Figure 2:
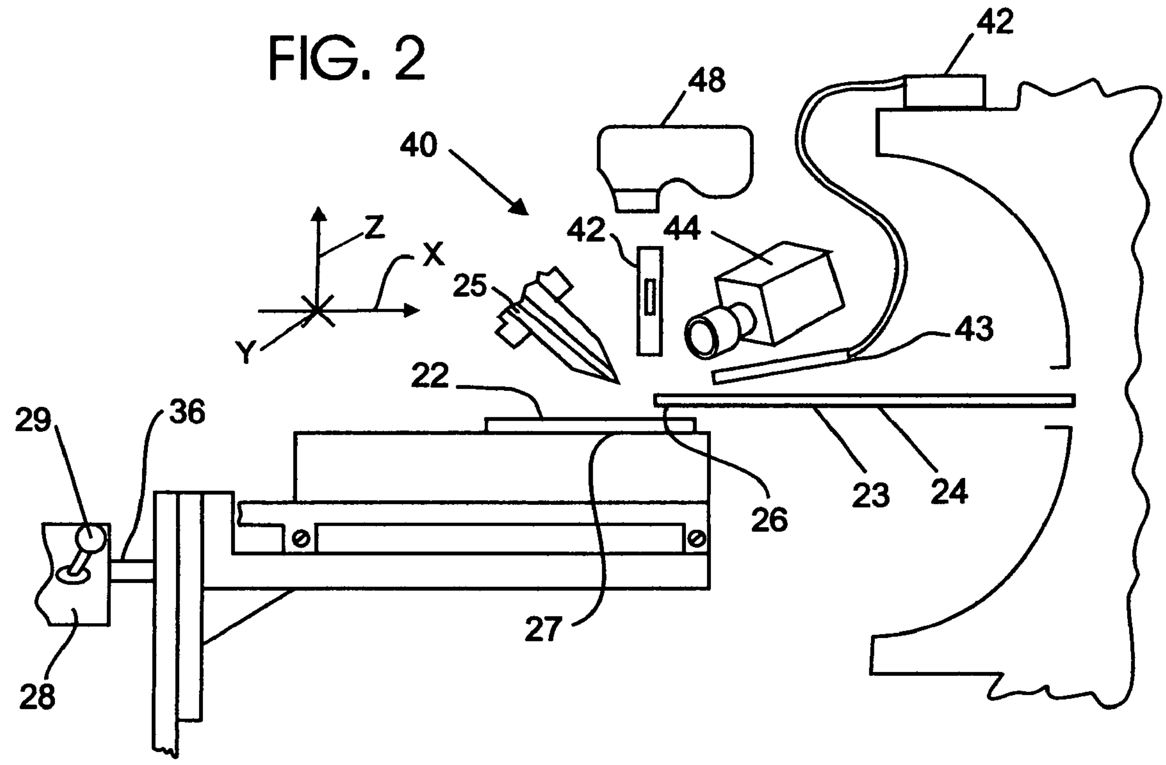
FIG. 2 is a perspective view of selected components of the FIG. 1 system drawn to a slightly larger scale.

With reference to FIGS. 1 and 2 and to enable samples to be collected from any spot along the surface 22, the collection tube 23, along with its tip 26, is supported in a fixed, stationary condition, and the surface 22 to be sampled is supported upon a support plate 27 for movement relative to the collection tube 23 along the indicated X-Y coordinate axes, i.e. within the plane of the support plate 27, and toward and away from the tip 26 of the collection tube 23 along the indicated Z-coordinate axis. The support plate 27 of the depicted system can take the form, for example, of a thin-layer chromatography (TLC) plate upon which an amount of material desired to be analyzed is positioned. It follows that for purposes of discussion herein, the surface 22 is supported by the support plate 27 within an X-Y plane (which corresponds generally to a horizontal plane), and the Z-axis is perpendicular to the X-Y plane.

The emitter 25 is fixed in position with respect to the capillary tube 23 and is arranged in a pre-set relationship with respect to the surface 22 so that a jet (gas or liquid) dispensed thereon impinges upon the surface 22 at a predetermined angle of incidence. It therefore follows that there exists a desired relationship, or spatial assignment, between the capillary tube 23, the emitter 25 and the surface 22 for optimum sample collection results.

Figure 3:
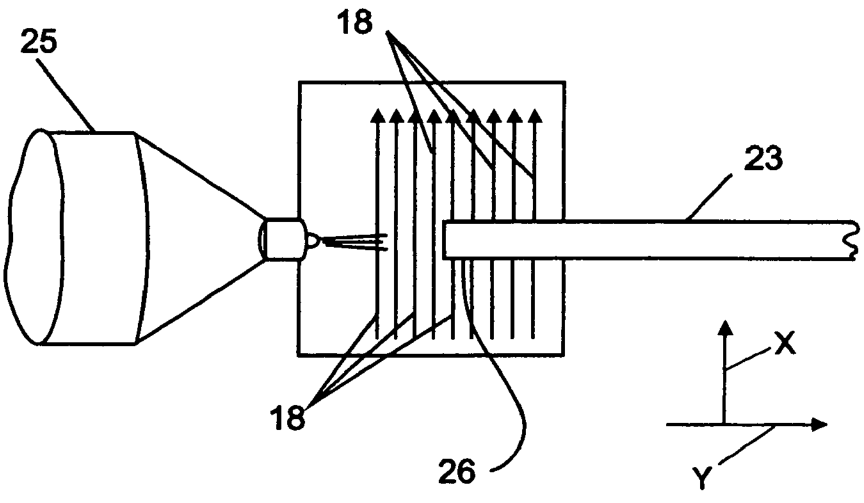
FIG. 3 is a view of the surface to be analyzed and various components of the FIG. 1 system as seen from above in FIG. 2.

The support plate 27 is, in turn, supportedly mounted upon the movable support arm 36 of an XYZ stage 28 (FIG. 1), for movement of the support plate 27, and the surface 22 supported thereby, along the indicated X, Y and Z coordinate directions. The XYZ stage 28 is appropriately wired to a joystick control unit 29 which is, in turn, connected to a first control computer 30 for receiving command signals therefrom so that during a sampling process performed with the system 20, samples can be taken from any desired spot (i.e. any desired X-Y coordinate location) along the surface 22 or along any desired lane (i.e. along an X or Y-coordinate path) across the surface 22 as the surface 22 is moved within the X-Y plane beneath the collection tube tip 26. For example, there is illustrated in FIG. 3 a view of the emitter 25 and capillary tube 23 arranged in position above the surface 22 for collecting samples from the surface 22 as the surface 22 is indexed beneath the capillary tube tip 26 and moved in sequence along a plurality of Y-coordinate lanes, or paths, indicated by the arrows 18. The characteristics of such relative movements of the surface 22 and the capillary tube 23, such as the sweep speeds and the identity of the X-Y locations at which the collection tube 23 is desired to be positioned in registry with the surface 22 can be input into the computer 30, for example, by way of a computer keyboard 31 or preprogrammed within the memory 33 of the computer 30.

Although a description of the internal components of the XYZ stage 28 is not believed to be necessary, suffice it to say that the X and Y-coordinate position of the support surface 27 (and surface 22) relative to the collection tube tip 26 is controlled through the appropriate actuation of, for example, a pair of reversible servomotors (not shown) mounted internally of the XYZ stage 28, while the Z-coordinate position of the support surface 27 (and surface 22) relative to the collection tube tip 26 is controlled through the appropriate actuation of, for example, a reversible stepping motor (not shown) mounted internally of the XYZ stage 28. Therefore, by appropriately energizing the X and Y-coordinate servomotors, the surface 22 can be positioned so that the tip 26 of the collection tube 23 can be positioned in registry with any spot within the X-Y coordinate plane of the surface 22, and by appropriately energizing the Z-axis stepping motor, the surface 22 can be moved toward or away from the collection tube tip 26.

With reference still to FIG. 1, the system 20 of the depicted example further includes a mass spectrometer 32 which is connected to the collection tube 23 for accepting samples conducted thereto for purposes of analysis, and there is associated with the mass spectrometer 32 a second control computer 34 for controlling the operation and functions of the mass spectrometer 32. An example of a mass spectrometer suitable for use with the depicted system 20 as the mass spectrometer 32 is available from MDS SCIEX of Concord, Ontario, Canada, under the trade designation 4000 Qtrap. Although two separate computers 30 and 34 are utilized within the depicted system 20 for controlling the various operations of the system components (including the mass spectrometer 32), all of the operations performed within the system 20 can, in the interests of the present invention, be controlled with a single computer or, in the alternative, be controlled through an appropriate software component loaded within the mass spectrometer software package. In this latter example, a single software package would control the XYZ staging, calculations (described herein) undertaken during the monitoring of the capillary tube-to-surface distance and the mass spectrometric detection.

It is a feature of the depicted system 20 that it includes distance-measuring means, generally indicated 40, for monitoring and controlling the spaced distance (i.e. the distance as measured along the indicated Z-coordinate axis) between the tip 26 of the collection tube 23 and the surface 22. Within the depicted system 20, the distance-measuring means 40 includes a laser sensor 42 supported directly above (i.e. along the Z-coordinate axis) the surface 22. If desired, a closed circuit color camera 44 can be supported above the 22 for collecting images during a sample-collection operation, and a video (e.g. a television) monitor 46 can be connected to the camera 44 for receiving and displaying the images collected by the camera 44. The monitor 46 is, in turn, connected to the first control computer 30 (by way of a video capture device 50) for conducting signals to the computer 30 which correspond to the images taken by the camera 44. These camera-generated images can be used by an operator to visually monitor and record events during the sample collection process.

Furthermore, the system 20 is provided with a webcam 48 having lens which is directed generally toward the collection tube 23 and surface 22 and which is connected to the computer 30 for providing an operator with a wide-angle view of the capillary tube 23 and the surface 22. The images collected by the webcam 48 are viewable upon a display screen, indicated 52, associated with the first control computer 30 by an operator to facilitate the initial positioning of the surface 22 relative to the capillary tube 23 in preparation of a sample-collection operation.

An example of a closed circuit camera suitable for use as the camera 44 is available from Panasonic Matsushita Electric Corporation under the trade designation Panasonic GP-KR222, and the camera 44 is provided with a zoom lens, such as is available from Thales Optem Inc. of Fairport, N.Y. under the trade designation Optem 70 XL. An example of a video capture device suitable for use as the video capture device 50 is available under the trade designation Belkin USB Video-Bus II from Belkin Corp. of Compton, Calif., and an example of a webcam which is suitable for use as the webcam 48 is available under the trade designation Creative Notebook Webcam from W. Creative Labs Inc., of Milpitas, Calif.

The operation of the system 20 and its distance measuring means 40 can be better understood through a description of the system operation wherein through its use of the distance-measuring means 40, the system 20 monitors the real-time measurement of the distance between the collection tube 23 and the surface 22 to be sampled and thereafter initiates adjustments, as needed, to the actual capillary tube-to-surface distance by way of the computer 30 and the XYZ stage 28 so that the optimum, or desired, capillary tube-to-surface distance (as measured along the Z-axis) is maintained throughout a sampling process, even though the surface 22 might be shifted along the X or Y coordinate axes for purposes of collecting a sample from other spots along the surface 22 or from along different lanes across the surface 22.

At the outset of one embodiment of a sample-collecting operation performed with the system 20, the tip 26 of the capillary tube 23 is positioned (during a set-up phase of the operation) at a desired capillary tube-to-surface distance which corresponds to an optimal, or desired, distance between the capillary tube 23 and the surface 22 for purposes of collecting a sample therefrom, and this optimal distance is determined (by way of the techniques described herein) and stored within the memory 33 of the first control computer 30. Such a positioning of the surface 22 in such a desired relationship with the capillary tube 23 is effected through appropriate (e.g. manual) manipulation of the joystick control unit 29 of the XYZ stage 28 and is monitored visually by an operator as he watches the TV monitor 46 during this set-up phase of the operation. Once the surface 22 has been positioned in its desired positional relationship with the capillary tube 23, signals which correspond to this initial (and actual) distance between the laser sensor 42 and the surface 22 are generated by the distance-measuring means 40 and sent to the computer 30 for storage (i.e. in its memory) and later use.

It will be understood that the aforementioned manual set-up of the capillary tube tip 26 at such a desired capillary tube-to-surface distance may not be necessary in a fully automated operation. For example, the XYZ stage 28 may not require re-adjustment between sucessive sample-collecting operations. Thus, for a second, or subsequent, sample collecting operation involving a similarly-mounted surface, appropriate commands can be initiated at the computer 30 to initiate a sample collecting operation without the need for a repeated set-up of the capillary tube-to-surface distance at optimal conditions.

Figure 4A:
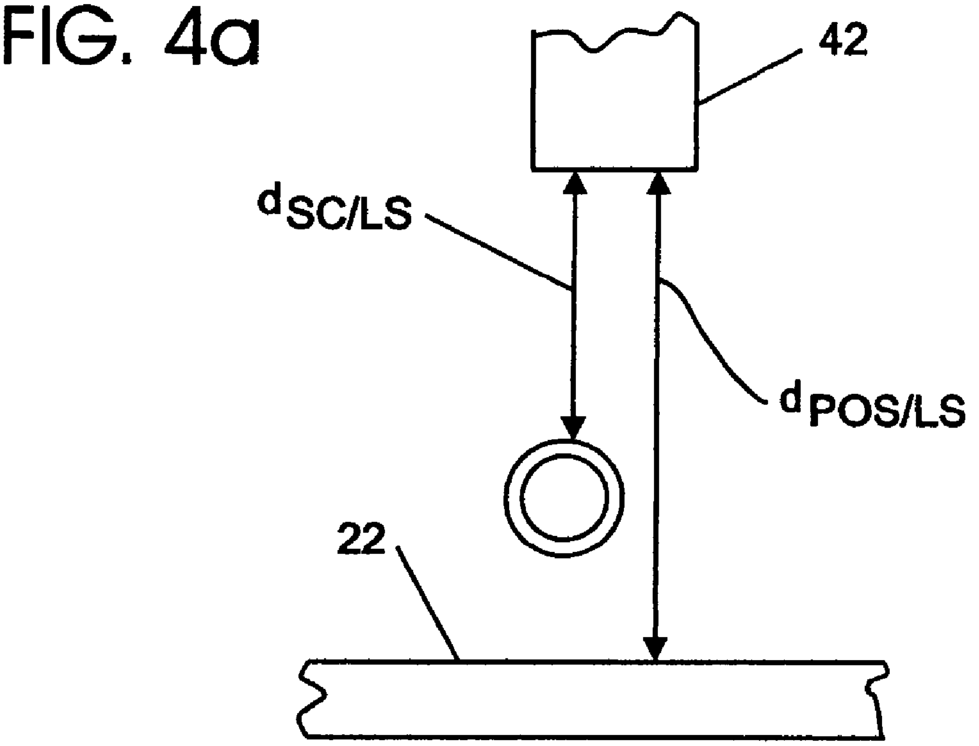
FIG. 4*a* is a view illustrating schematically an exemplary positional relationship between the laser sensor, the sample collection instrument and the surface of the FIG. 1 system seen generally from the front.
Figure 4B:
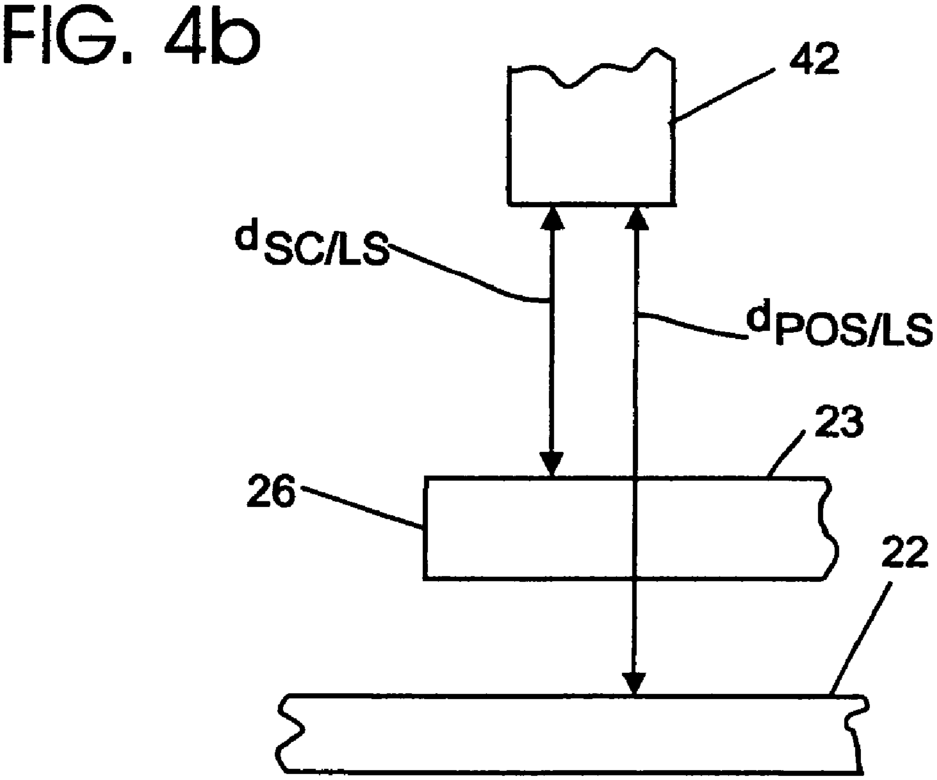
FIG. 4*b* is a view as seen generally from the right side in FIG. 4*a*.

As mentioned earlier and as illustrated in FIGS. 4*a* and 4*b*, the laser sensor 42 of the distance-measuring means 40 is disposed directly above the surface 22. For measurement-determining purposes, the laser sensor 42 can be directed toward the surface 22 or toward a location on the (upper) surface of the support plate 27 situated alongside the support 22. Accordingly and as used herein, the phrase laser sensor-to-surface distance, indicated $d_{POS/LS}$ in FIGS. 4*a* and 4*b*, can be interpreted as being the actual distance between the laser sensor and the surface or the actual distance between the laser sensor and a location on the (upper) surface of the support plate 27 upon which the surface 22 is supported and wherein such location is disposed beside the surface 22.

The use of laser sensors, like the laser sensor 42 of the distance-measuring means 40, for measuring the distance from a laser sensor to an object are known so that a detailed description of the operation and structural details of a laser sensor are not believed to be necessary. Suffice it to say that common laser sensors used for measurement purposes emit a laser beam toward an object, and a beam, in turn, is reflected from the object back toward the sensor. The reflected beam is sensed by the laser sensor, and the period required for the laser beam to make the round trip is detected. The distance between the laser sensor and the object is subsequently calculated as being equal to one-half of the time elapsed (during the round trip of the laser beam) multiplied by the velocity of the laser beam.

Figure 5A:
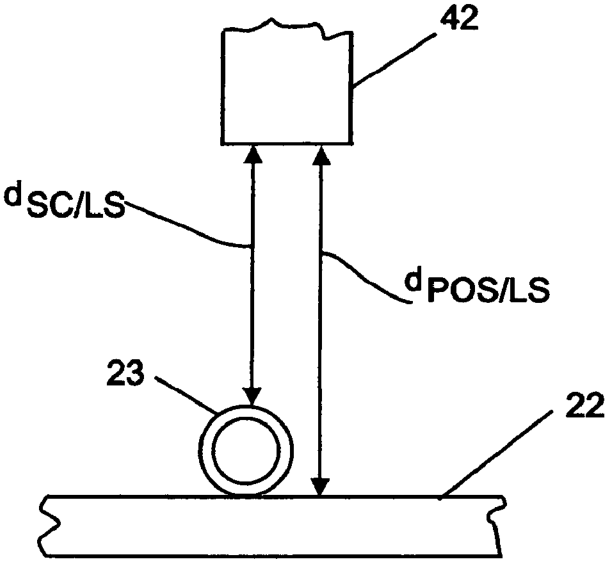
FIG. 5*a* is a view illustrating schematically an exemplary relationship between the components of the FIG. 4*a* view when positioned in an optimum relationship for sample collecting purposes.

With reference to FIG. 5*a*, there is depicted a typical relationship between the laser sensor 42, the capillary tube 26 and the surface 22 of the depicted system 20 when the positional relationship (i.e. the distance) between the capillary tube 23 and the surface 22 is optimum for sample collecting purposes. More specifically, the surface 22 is situated generally in the X-Y plane, the capillary tube 23 is disposed immediately above the surface 22 and the laser sensor 42 is disposed on the side of the capillary tube 23 opposite the surface 22.

Furthermore, the laser sensor 42 is fixed in relationship to the capillary tube 26. In other words, the Z-coordinate distance as measured between the laser sensor 42 and the capillary tube 23, indicated $d_{SC/LS}$ in FIGS. 4*a*, 4*b* and 5*a*, should be constant throughout a sample collecting operation even though the surface 22 may be raised or lowered (by way of the XYZ stage 28) during the operation. If it is therefore desired to determine the actual distance between the capillary tube 23 and the surface 22 once the distance between the laser sensor 42 and the capillary tube 23 (indicated $d_{SC/LS}$ in FIGS. 4*a*, 4*b* and 5*a*) and the thickness of the capillary tube 23 are known, the distance between the capillary tube 23 and the surface 22 can be calculated by subtracting the thickness of the capillary tube 23 from the distance between the laser sensor 42 and the surface 22 ($d_{POS/LS}$).

Once the actual distance between the laser sensor 42 and the surface 22 during this set-up stage (i.e. when the capillary tube-to-surface distance is set to its optimum) is determined, this laser source-to-surface distance is stored in the computer 30 and designated, for present purposes, as the target laser sensor-to-surface distance which is desired to be maintained throughout the sample collection process. In other words, once the target laser source-to-surface distance is stored within the computer 30, the sampling process can be initiated by moving the surface 22 relative to the capillary tube 23 along the X-Y plane for the purpose of collecting samples from desired locations on, or along desired lanes across, the surface 22. During the sampling process, the actual distance between the laser sensor 42 and the surface 22 is periodically measured with the distance-measuring means 40, and each measured actual laser sensor-to-surface distance is subsequently compared to the target laser sensor-to-surface distance, and adjustments are made, if necessary, to maintain the actual laser sensor-to-surface distance close to the target laser sensor-to-surface distance.

It will be understood that for comparison purposes, the computer 30 (i.e. the memory 30 thereof) is preprogrammed with information relating to acceptable distance (i.e. tolerance) limits relative to the target distance. In other words, if it is determined that the actual laser sensor-to-surface distance differs from the target laser sensor-to-surface distance by an amount which is outside of these tolerance limits, commands are sent to the XYZ stage 28 to initiate Z-axis adjustments between the capillary tube 23 and the surface 22 to bring the actual distance back in line with (i.e. within the tolerance limits of) the target laser source-to-surface distance. It follows that such preset tolerance limits correspond to a predetermined range within which the actual laser source-to-surface distance can be close enough (e.g. within +3 μm) to the desired target laser source-to-surface distance that no additional movement of the surface 22 toward or away from the capillary tube 23 is necessary.

Figure 5B:
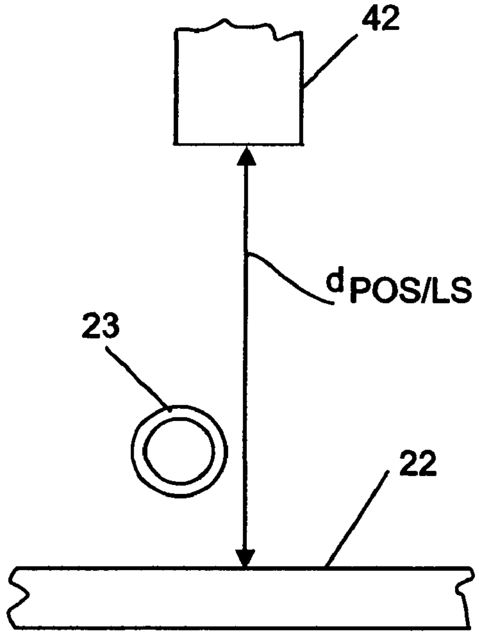
FIG. 5*b* is a view similar to that of FIG. 5*a* except that the components are positioned in one non-optimal relationship for sampling collecting purposes.

With reference to FIGS. 5*b* and 5*b*, there are depicted exemplary relationships between the laser sensor 42, the capillary tube 23 and the surface 22 when the capillary tube-to-surface distance is not optimum for sample collecting purposes. By comparison and as mentioned earlier, the capillary tube-to-surface distance in the component relationship depicted in the FIG. 5*a* view is taken to be optimum for sample collecting purposes, and accordingly the laser sensor-to-surface distance in this FIG. 5*a* relationship is determined during the set-up phase of the sample collecting operations. However, in the FIG. 5*b* example, the laser sensor-to-surface distance ($d_{POS/LS}$) is greater than the laser sensor-to-surface distance determined in the set-up phase—thus indicating that a wider-than-desired gap has developed between the capillary tube 23 and the surface 22. If the determined laser sensor-to-surface distance of the FIG. 5*b* example is outside of the pre-set tolerance limits, then the computer 30 will initiate appropriate commands to move (by way of the XYZ stage 28) the surface 22 toward the capillary tube 23 so that the actual laser sensor-to-surface distance moves closer to the target laser sensor-to-surface distance (e.g. the laser sensor-to-surface distance determined during the set-up phase of the operation).

Figure 5C:
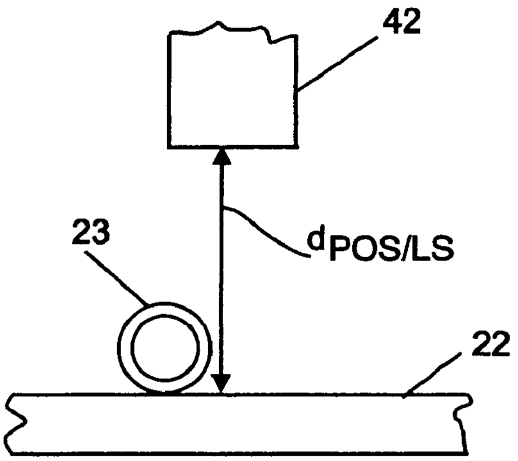
FIG. 5*c* is a view similar to that of FIG. 5*a* except that the components are positioned in another non-optimal relationship for sample collecting purposes.

Similarly, in the FIG. 5*c* example, the laser sensor-to-surface distance ($d_{POS/LS}$) is less than the desired laser sensor-to-surface distance determined in the set-up phase—thus indicating that a smaller-than-desired gap has developed between the capillary tube 23 and the surface 22. In fact, such a determination could indicate that the capillary tube 23 has been bent upwardly by the surface 22. If the determined laser sensor-to-surface distance of the FIG. 5*c* example is outside the pre-set tolerance limits, then the computer 30 will initiate appropriate commands to move (by way of the XYZ stage 28) the surface away from the capillary tube 23 so that the actual laser sensor-to-surface distance moves closer to the target laser sensor-to-surface distance (i.e. the laser sensor-to-surface distance determined during the set-up phase of the operation).

It can therefore be seen that in accordance with an embodiment of the present invention, the control of the actual capillary tube-to-surface distance during a sample collecting process is comprised of a series of steps. Firstly and in preparation of a sample collection operation performed with the system 20, an operator adjusts the Z-axis position of the surface 22 until the surface 22 is positioned in relatively close proximity to the tip 26 of the capillary tube 23 so that the capillary tube tip-to-surface distance is optimum for sample collection purposes. During this set-up stage, the relative position between the surface 22 and the capillary tube tip 26 can be visually monitored by the operator who watches the images obtained through the webcam 48 and displayed upon the computer display screen 52. It will be understood, however, and as mentioned earlier, this initial set-up stage can be omitted in a fully automated operation.

Once the surface 22 is moved into a desired positional relationship with the capillary tube tip 26 during this set-up stage, the operator enters appropriate commands into the computer 30 through the keyboard 31 thereof so that the initial (and actual) laser sensor-to-surface distance is determined with the distance-measuring means 40. In this connection, distance-measuring means 40 (by way of the laser sensor 42) is used to measure the actual laser sensor-to-surface distance, and a signal which corresponds to the measured distance is conducted from the distance-measuring means 40 to the computer 30. This initial laser sensor-to-surface distance is stored within the computer memory 30 and designated, for present purposes, as the target laser sensor-to-surface distance to which subsequently-determined actual laser sensor-to-surface distances are ultimately compared.

When a sample collection process is subsequently undertaken, periodic measurements of the actual laser sensor-to-surface distances are taken with the distance-measuring means 40. Electrical signals corresponding to these measured distances are immediately transmitted to the computer 30 for comparison to the target laser sensor-to-surface distance. Such periodic measurements can be taken at preselected and regularly-spaced intervals of time (e.g. every one-half second), and the time interval between which these actual laser sensor-to-surface distances are taken can be preprogrammed into, or selected at, the computer 30.

As far as the analysis of the collected samples are concerned, the samples collected from the surface 22 through the collection tube 23 are conducted to the mass spectrometer 32 and are analyzed thereat in a manner known in the art. If desired, a second control computer 34 (introduced earlier and shown in FIG. 1), having a display screen 38 and a keyboard 39, can be connected to the mass spectrometer 32 for controlling its operations. In other words, the keyboard 39 can be used for entering commands into the computer 34 and thereby controlling the operation and data collection of the mass spectrometer 32.

It is common that during a sample-collecting operation performed with the system 20, the surface 22 is moved relative to the capillary tube 23 within the X-Y plane so that the tip 26 of the capillary tube 23 samples the surface 22 as the surface 22 sweeps beneath the probe 24. For this purpose and by way of example, the computer 30 can be pre-programmed to either index the surface 22 within the X-Y plane so that alternative locations, or spots, can be positioned in sample-collecting registry with the capillary tube tip 26 for obtaining samples at the alternative locations or to move the surface 22 along an X or Y coordinate axis so that the surface 22 is sampled with the capillary tube 23 along a selected lane (such as the paths 18 of FIG. 3) across the surface 22.

Figure 6A:
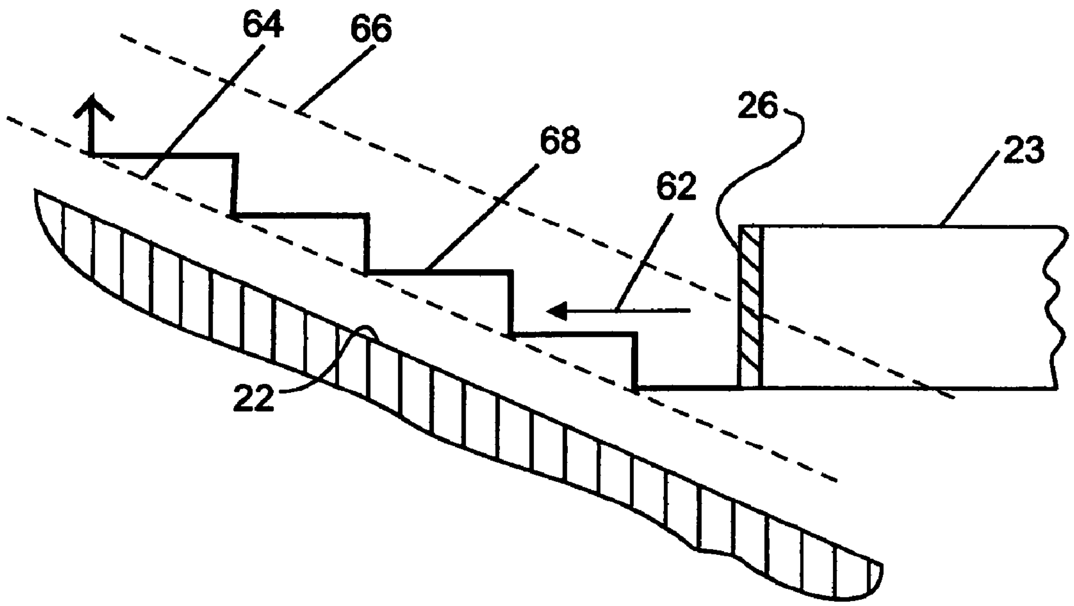
FIGS. 6*a* and 6*b* are views illustrating schematically the path of the tip of the sample capillary tube relative to the surface of the FIG. 1 system during a continuous re-optimization of the capillary tube-to-surface distance.
Figure 6B:
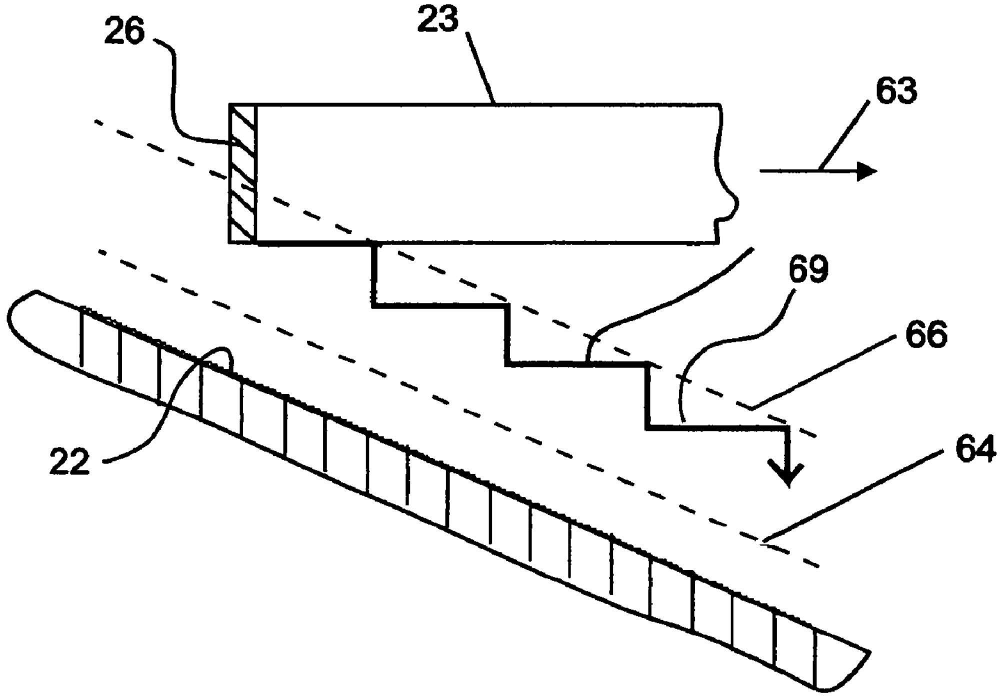

With reference to FIGS. 6*a* and 6*b*, there is schematically illustrated the positional relationship between the surface 22 and the capillary tube tip 26 as the surface 22 is passed beneath the capillary tube tip 26 during a sample-collection operation and the movement of the capillary tube tip 26 during a re-optimization of the capillary tube-to-surface position. (Within both FIGS. 6*a* and 6*b*, the surface 22 is depicted at an exaggerated angle with respect to the longitudinal axis of the capillary tube 23 for illustrative purposes.) More specifically and within FIG. 6*a*, the surface 22 and the capillary tube 23 are moved relative to one another during a sample-collection process so that samples are collected from a lane of the surface 22 in the negative (−) X-coordinate direction indicated by the arrow 62, and within FIG. 6*b*, the surface 22 and the capillary tube 23 are moved relative to one another during a sample-collection process so that samples are collected from a lane of the surface 22 in the positive (+) X-coordinate direction indicated by the arrow 63.

Meanwhile, the dotted lines 64 and 66 depicted in FIGS. 6*a* and 6*b* indicate the outer boundaries, or preset limits, between which the capillary tube tip 26 should be positioned in order that the optimum, or desired, distance is maintained between the surface 22 and the capillary tube tip 26 for sample collecting purposes. For example and in order to maintain the optimum distance between the capillary tube 26 and the surface 22 at a distance which corresponds to the optimum distance for sample collecting purposes, the capillary tube tip 26 should not be moved closer to the surface 22 (along the Z-axis) than is the line 64 nor should the capillary tube tip 26 be moved further from the surface 22 than is the line 66. In practice, the spaced-apart distance between the preset limits (as measured along the Z-axis) can be within a few microns, such as about 6 μm, from one another so that the preset limits (corresponding to the dotted lines 64 and 66) are each spaced at about 3 μm from the target distance at which the surface 22 is optimally-arranged in relationship to the capillary tube tip 26. Accordingly and during a sample-collection operation performed with the system 20, actual laser sensor-to-surface distances are determined at spaced intervals of time, and appropriate signals which correspond to these actual laser sensor-to-surface distances are transmitted to the computer 30.

Each measured actual laser sensor-to-surface distance is then compared, by means of appropriate software 70 (FIG. 1) running in the computer 30, to the desired target distance between the laser sensor 42 and the surface 22, which target distance is bounded by the prescribed limit lines 64 and 66 (of FIG. 6*a* or 6*b*). If the actual laser sensor-to-surface distance is determined to fall within the prescribed limit lines 64 and 66, no relative movement or adjustment of the surface 22 and the capillary tube tip 26 along the Z-axis is necessary. However, if the actual laser surface-to-surface distance is determined to fall upon or outside of the prescribed limit lines 64 and 66, relative movement between or an adjustment of the relative position between the surface 22 and the capillary tube tip 26 is necessary to bring the actual laser sensor-to-surface distance back within the prescribed limits corresponding with the limit lines 64 and 66. Accordingly and during a sample-collection operation as depicted in FIG. 6*a* in which frequent adjustments of the surface 22 and the capillary tube 23 along the Z-axis must be made as the capillary tube 23 is moved relative to the surface 22 along the negative (−) X-coordinate axis, the path followed by the capillary tube tip 26 relative to the surface 22 can be depicted by the stepped path 68.

By comparison and during a sample-collection operation as depicted in FIG. 6*b* in which frequent adjustments of the surface 22 and the capillary tube 23 along the Z-axis must be made as the capillary tube 23 is moved relative to the surface 22 along the positive (+) coordinate axis, the path followed by the capillary tube tip 26 relative to the surface 22 can be depicted by the stepped path 69.

As mentioned earlier, by equating the laser sensor-to-support plate to the laser sensor-to-surface (as is the case when the laser sensor 42 is used to measure the distance to a location on the support plate 27 situated alongside the surface 22, rather than to the surface 22 itself), could be a source for error, especially if the support plate 27 is canted at an appreciable angle with respect to the X-Y plane. However, if in the event that the support plate 27 is canted with respect to the X-Y plane, compensation for such an error can be made. For example, there is shown in FIG. 7 a laser source-to-surface relationship wherein the surface 22 is canted at an angle of M degrees with respect to the X-Y plane. It can be seen in this FIG. 7 view that the actual laser sensor-to-surface distance (along the Z-coordinate direction) (i.e. $d_{POS/LS}$) would inaccurately represent the Z-axis distance between the capillary tube 23 and the surface 22.

In a system 20 used by applicants, the Y-axis distance between the line of the beam emitted from the laser source 42 and the center of the capillary tube is about 500 μm. Applicants have also found that if, for example, the angle ω (i.e. the angle of tilt of the surface 22) is about one degree (which, in practice, is so small that it is hard to adjust manually), then the product of tan(ω) and 500 μm is only about 9 μm. This 9 μm value is an acceptable error and would not likely have a noticable effect on the signal levels sensed across the surface. If, in the event, that such an error is not acceptable, a system can employ two laser sensors to obtain a more accurate representation of the laser sensor-to-surface distance along the Z-axis distance.

For example, there is depicted in FIG. 8 a fragment of a system, generally indicated 120, including a surface 122, a capillary tube 123 and a pair of laser sensors 142 and 143 arranged above the capillary tube 123 so as to emit downwardly-directed beams equidistant from and on opposite sides of the capillary tube 123. An accurate calculation of the laser sensor-to-surface distance can be obtained by averaging the laser sensor-to-surface distances measured by the two laser sensors 142, 143. The value resulting from this calculation can be taken to be representative of the Z-axis distance between the capillary tube 123 and the surface 122 to reduce the likelihood of error resulting from a tilting of the surface 122 with respect to the X-Y plane.

It follows from the foregoing that a system 20 and associated method has been described for controlling the capillary tube-to-surface distance during a surface sampling process utilizing a sample collection device. In this connection, the system 20 automates the formulation of real-time re-optimization of the sample collection instrument-to-surface distance using distance measurements obtained with a laser sensor 42. The distance measurement analysis includes the periodic measurement of the actual distance between the laser sensor 42 and the surface 22 followed by a comparison of each of the measured actual laser sensor-to-surface distances to a target laser sensor-to-surface distance. By comparing the actual laser sensor-to-surface distance to a target laser sensor-to-surface distance (which corresponds to a desired capillary tube-to-surface distance which can, for example, be established during a set-up phase of the procedure, the system 20 can automatically and continuously re-optimize the capillary tube-to-surface distance during the sample collection procedure by adjusting the spaced laser sensor-to-surface distance, as necessary, along the Z-coordinate axis.

If desired, the surface 22 can be moved along the X-Y plane (and relative to the capillary tube 23) to accommodate the automatic collection of samples with the capillary tube 23 along multiple parallel lanes upon the surface 22 with equal or customized spacing between the lanes. Samples can be collected with the aforedescribed system 20 at constant scan speeds or at customized, or varying, scan speeds.

The principle advantages provided by the system 20 and associated method for controlling the capillary tube-to-surface distance throughout a sample-collection process relate to the obviation of any need for operation intervention and manual control of the capillary tube-to-surface distance (i.e. along the Z-coordinate axis) during a sample-collection process. Accordingly, the precision of a sample-collection operation conducted with the system 20 will not be limited by the skill of an operator required to monitor the sample-collection process. Moreover, the system 20 also provides advantages which bear directly upon the accuracy of samples collected with the capillary tube 23. For example, because the optimum, or desired, capillary tube-to-surface distance is maintained throughout the sample collecting process, the likelihood that the surface 22 would be inaccurately sampled—which could lead to misinterpretation of the collected samples, when analyzed—is substantially reduced.

The aforedescribed system 20 and process provide a further advantage in sample collecting equipment which employs componentry, such as the emitter 25 having a spray tip, which are intended to be positioned in a desired spatial relationship, or assignment, with one another. For example, in a sample collection system in which a spray tip and surface to be sampled are typically arranged in a fixed relationship with respect to one another during a sample collection operation, a change in the spray tip-to-surface distance also results in a change in the sampling capillary-to-surface distance by a corresponding amount. However, because the system 20 and process of the present invention helps to maintain a desired capillary tube-to-surface distance during a sample collecting process, the system 20 and process also help to maintain desired spatial relationship between the emitter, the collection tube and the surface to be sampled.

It will be understood that numerous modifications and substitutions can be had to the aforedescribed embodiment without departing from the spirit of the invention. For example, although the aforedescribed embodiments have been shown and described wherein the capillary tube 23 is supported in a fixed, stationary condition and the surface 22 is moved relative to the capillary tube 23 along either the X, Y or Z-coordinate directions to position a desired spot or development lane in registry with the capillary tube 23, alternative embodiments in accordance with the broader aspects of the present invention can involve a surface which is supported in a fixed, stationary condition and a capillary tube, along with the laser sensor fixed in relationship therewith, which is movable relative to the surface along either the X, Y or Z coordinate directions. Accordingly, the aforedescribed embodiments are intended for the purpose of illustration and not as limitation.

The invention claimed is:

1. A sampling system comprising:

a collection instrument through which a physical specimen sample is collected from a surface to be analyzed;

means for moving the collection instrument and the surface toward and away from one another and wherein there exists a desired positional relationship between the collection instrument and the surface for purposes of collecting a physical specimen sample from the surface;

distance-measuring means including a laser sensor arranged in a fixed positional relationship relative to the collection instrument for generating a signal which corresponds to the actual distance between the laser sensor and the surface and wherein there exists a target distance between the laser sensor and the surface when the collection instrument and the surface are arranged in the desired positional relationship for purposes of collecting a physical specimen sample from the surface;

means for receiving the signal which corresponds to the actual distance between the laser sensor and the surface; and comparison means for comparing the actual distance between the laser sensor and the surface to the target distance between the laser sensor and the surface and for initiating the movement of the laser sensor and the surface toward or away from one another when the difference between the actual distance between the laser sensor and the surface during a sample collecting operation and the target distance is outside of a predetermined range so that by moving the surface and the collection instrument toward or away from one another during a sample collecting operation, the actual distance between the laser sensor and the surface approaches the target distance.

2. The system as defined in claim 1 wherein the surface is supported substantially within a plane and the laser sensor is arranged substantially normal to said plane for measuring the distance thereto.

3. The system as defined in claim 1 wherein the sampling is supported substantially within a horizontal plane and the laser sensor is arranged substantially vertically above said horizontal plane for measuring the distance thereto.

4. The system as defined in claim 1 further including a computer having a memory within which the target distance is stored and a comparison circuit for comparing the actual distance between the laser sensor and the surface to the target distance.

5. The system as defined in claim 1 wherein the surface which is sampled with the collection instrument is disposed substantially within an X-Y plane and is spaced from the collection instrument along a Z-coordinate axis, and the means for moving the surface and the collection instrument toward and away from one another further includes means for moving the surface relative to the collection instrument within the X-Y plane so that any of a number of coordinate locations along the surface can be positioned adjacent the collection instrument for sample collecting purposes.

6. The system as defined in claim 1 wherein the laser sensor is a first laser sensor and the distance-measuring means includes a second laser sensor arranged in a fixed positional relationship relative to the collection instrument for generating a signal which corresponds to the actual distance between the second laser sensor and the surface, the first and second laser sensors are arranged on opposite sides of the collection instrument for generating signals which correspond to the actual distances between the first and second laser sensors and the surface and the system further includes calculator means for averaging the actual distances to which the generated signals correspond so that the actual distance compared by the comparison means is the averaged actual distances.

7. In a surface sampling system for collecting physical specimen samples from a surface to be analyzed for analysis wherein the system includes a collection instrument with which physical specimen samples are collected from the surface to be sampled and wherein there exists a desired positional relationship between the collection instrument and the surface for purposes of collecting the physical specimen samples from the surface, the improvement comprising:

distance-measuring means including a laser sensor mounted in a fixed positional relationship with the collection instrument for generating a signal which corresponds to the actual distance between the laser sensor and the surface;

a computer containing information relating to a target distance between the laser sensor and the surface when the collection instrument is in its desired positional relationship with the surface for purposes of collecting physical samples from the surface;

means connected to the computer for moving the surface and the laser sensor toward and away from one another in response to commands received from the computer;

the computer includes means for receiving the signal which corresponds to the actual distance between the laser sensor and the surface; and the computer further includes comparison means for comparing the actual distance between the laser sensor and the surface and the target distance during a sample collecting operation and for initiating corrective movement of the surface and the laser sensor toward or away from one another so that during a sample collecting operation, the actual distance approaches the target distance when the actual distance is outside of a predetermined range and so that the corrective movement of the surface and the laser sensor toward or away from one another is initiated by virtue of the magnitude of said difference between the actual and target distances, rather than by virtue of a relative movement between the laser sensor and the surface.

8. The improvement of claim 7 wherein the sampling is supported substantially within a plane and the laser sensor is arranged substantially normal to said plane for measuring the distance thereto.

9. The improvement of claim 7 further including a computer having a memory within which the target distance is stored and a comparison circuit for comparing the actual distance between the laser sensor and the surface to the target distance.

10. The improvement as defined in claim 7 wherein the surface which is sampled with the collection instrument is disposed substantially within an X-Y plane and is spaced from the collection instrument and the laser sensor along a Z-coordinate axis, and the means for moving the surface and the laser sensor toward and away from one another further includes means for moving the surface relative to the laser sensor within the X-Y plane so that any of a number of coordinate locations along the surface can be positioned into registry with the collection instrument for purposes of collecting physical specimen samples from the surface.

11. A method for sampling a surface to be analyzed, the method comprising the steps of:

providing a collection instrument through which a physical specimen sample is collected from a surface to be analyzed when the collection instrument is disposed in a desired positional relationship with respect to the surface;

providing distance-measuring means including a laser sensor for generating a signal which corresponds to the actual distance between the laser sensor and the surface and arranging the laser sensor in a fixed positional relationship relative to the collection instrument;

supporting the laser sensor and the surface relative to one another to permit movement of the laser sensor and the surface toward and away from one another and wherein there exists a target distance between the laser sensor and the surface when the collection instrument and the surface are arranged in the desired positional relationship with respect to one another;

generating a signal with the distance-measuring means which corresponds to the actual distance between the laser sensor and the surface;

determining the actual distance between the laser sensor and the surface from the signal generated by the distance-generating means; and comparing the actual distance between the laser sensor and the surface to the target distance during a sample collecting operation and initiating the movement of the surface and the laser sensor toward or away from one another when the difference between the actual distance between the laser sensor and the surface and the target distance is outside of a predetermined range so that by moving the surface and the laser sensor toward or away from one another during a sample collecting operation, the actual distance approaches the desired target distance.

12. The method as defined in claim 11 wherein the step of generating a signal is preceded by a step of arranging the surface and the collection instrument in an initial positional relationship with respect to one another and utilizing as the target distance the actual distance between the laser sensor and the surface when the surface and the collection instrument are arranged in the initial positional relationship.

13. The method as defined in claim 11 wherein the surface is supported substantially within a plane and step of supporting arranges the laser sensor substantially normal to said plane for measuring the distance thereto.

14. The method as defined in claim 11 wherein the step of supporting arranges the collection instrument in a condition for collecting samples from the surface.

15. The method as defined in claim 11 wherein the step of comparing is performed by a computer.

16. A method for collecting physical specimen samples from a surface to be analyzed, the method comprising the steps of:

providing a collection instrument which is adapted to sample a surface for analysis when the collection instrument is disposed in a desired positional relationship with respect to the surface for purposes of collecting physical specimen samples from the surface;

providing distance-measuring means including a laser sensor for generating a signal which corresponds to the actual distance between the laser sensor and the surface and arranging the laser sensor in a fixed positional relationship with respect to the collection instrument;

supporting the collection instrument and the surface relative to one another to permit movement of the collection instrument and the surface toward and away from one another;

moving the surface and the collection instrument relative to one another to an initial, desired positional relationship with respect to one another for optimum sample-collecting purposes;

determining the actual, initial distance between the laser sensor and the surface when the surface is in its initial, desired positional relationship with the collection instrument and designating this actual, initial distance as a target distance between the laser sensor and the surface;

initiating a sampling collection process by moving the collection instrument relative to and across the surface;

during the sample collection process, generating a distance-carrying signal with the distance-measuring means which corresponds to the actual distance between the laser sensor and the surface;

comparing the actual distance between the laser sensor and the surface to the target distance between the laser sensor and the surface; and initiating corrective movement of the surface and the laser sensor toward or away from one another when the difference between the actual distance between the laser sensor and the surface and the target distance is outside of a predetermined range so that by moving the surface and the laser sensor toward or away from one another during a sample collecting process, the actual distance approaches the desired target distance and so that the corrective movement of the surface and the laser sensor toward or away from one another is initiated by virtue of the magnitude of said difference between the actual and target distances, rather than by virtue of a relative movement between the laser sensor and the surface.

17. The method as defined in claim 16 wherein the steps of generating a distance-carrying signal and comparing are both carried out at periodic intervals during the sample collection process.

* * * * *